United States Patent
Qiao et al.

(10) Patent No.: US 10,019,085 B2
(45) Date of Patent: Jul. 10, 2018

(54) SENSOR LAYER HAVING A PATTERNED COMPLIANT LAYER

(71) Applicant: Apple Inc., Cupertino, CA (US)

(72) Inventors: Rui Qiao, Cupertino, CA (US); Charley T. Ogata, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 15/005,200

(22) Filed: Jan. 25, 2016

(65) Prior Publication Data

US 2017/0090618 A1 Mar. 30, 2017

Related U.S. Application Data

(60) Provisional application No. 62/235,414, filed on Sep. 30, 2015.

(51) Int. Cl.
  *G06F 3/044* (2006.01)
  *G06F 3/041* (2006.01)

(52) U.S. Cl.
  CPC .... *G06F 3/041* (2013.01); *G06F 2203/04105* (2013.01)

(58) Field of Classification Search
  CPC combination set(s) only.
  See application file for complete search history.

(56) References Cited

U.S. PATENT DOCUMENTS

| | | |
|---|---|---|
| 4,675,569 A | 6/1987 | Bowman et al. |
| 4,712,037 A | 12/1987 | Verbeek |
| 4,989,457 A | 2/1991 | Berger et al. |
| 5,447,074 A | 9/1995 | Polaert et al. |
| 5,543,589 A | 8/1996 | Buchana et al. |
| 5,553,500 A | 9/1996 | Grahn et al. |
| 5,680,160 A | 10/1997 | LaPointe |
| 5,917,165 A | 6/1999 | Platt et al. |
| 7,114,402 B2 | 10/2006 | Winkler et al. |
| 7,154,481 B2 | 12/2006 | Cross et al. |
| 7,211,885 B2 | 5/2007 | Nordal et al. |
| 7,511,702 B2 | 3/2009 | Hotelling |
| 7,598,652 B2 | 10/2009 | Kornbluh et al. |
| 7,791,596 B2 | 9/2010 | Errico et al. |
| 8,031,275 B2 | 10/2011 | Lee |
| 8,169,332 B2 | 5/2012 | Son |
| 8,199,122 B2 | 6/2012 | Yamamoto et al. |

(Continued)

FOREIGN PATENT DOCUMENTS

| | | |
|---|---|---|
| CN | 101046720 | 10/2007 |
| CN | 101071354 | 11/2007 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Van N Chow
(74) *Attorney, Agent, or Firm* — Brownstein Hyatt Farber Schreck, LLP (57) ABSTRACT

A sensor layer, such as a force sensor layer, can be in included in an electronic device. The sensor layer includes a patterned compliant layer that is positioned between a first substrate and a second substrate. The patterned compliant layer includes multiple angled compliant elements that are angled at one or more angles with respect to the first and second substrates.

16 Claims, 10 Drawing Sheets

(56) References Cited

U.S. PATENT DOCUMENTS

| | | |
|---|---|---|
| 8,305,241 B2 | 11/2012 | Wang et al. |
| 8,339,775 B2 | 12/2012 | Degner et al. |
| 8,345,013 B2 | 1/2013 | Heubel et al. |
| 8,434,951 B2 | 5/2013 | Wittenberg |
| 8,446,551 B2 | 5/2013 | Gu |
| 8,542,203 B2 | 9/2013 | Serban et al. |
| 8,547,350 B2 | 10/2013 | Anglin et al. |
| 8,547,623 B2 | 10/2013 | Parry-Jones |
| 8,564,559 B2 | 10/2013 | Hou |
| 8,627,716 B2 | 1/2014 | Son |
| 8,633,899 B2 | 1/2014 | Um et al. |
| 8,633,916 B2 | 1/2014 | Bernstein et al. |
| 8,635,919 B2 | 1/2014 | Suzuki |
| 8,724,038 B2 | 5/2014 | Ganapathi et al. |
| 8,890,853 B2 | 11/2014 | Schuele et al. |
| 8,929,085 B2 | 1/2015 | Franklin et al. |
| 9,001,081 B2 | 4/2015 | Pope |
| 9,116,569 B2 | 8/2015 | Stacy et al. |
| 9,134,397 B2 | 9/2015 | Solven et al. |
| 9,195,354 B2 | 11/2015 | Bulea et al. |
| 9,274,654 B2 | 3/2016 | Slobodin et al. |
| 9,349,552 B2 | 5/2016 | Huska et al. |
| 9,395,583 B2 | 7/2016 | Kim et al. |
| 9,454,255 B2 | 9/2016 | Kallassi et al. |
| 9,454,268 B2 | 9/2016 | Badaye et al. |
| 9,489,100 B2 | 11/2016 | Tsutsumi |
| 9,517,547 B2 | 12/2016 | Kasashima et al. |
| 9,696,223 B2 | 7/2017 | Lisseman |
| 9,841,850 B2 | 12/2017 | Schediwy et al. |
| 2005/0219222 A1 | 10/2005 | Johnson et al. |
| 2007/0085837 A1 | 4/2007 | Ricks et al. |
| 2008/0231605 A1 | 9/2008 | Yang |
| 2010/0013785 A1 | 1/2010 | Murai |
| 2011/0096013 A1 | 4/2011 | Krumpelman et al. |
| 2011/0193791 A1 | 8/2011 | Tong et al. |
| 2012/0038577 A1 | 2/2012 | Brown et al. |
| 2012/0075243 A1 | 3/2012 | Doi et al. |
| 2012/0098788 A1 | 4/2012 | Sekiguchi |
| 2013/0018489 A1 | 1/2013 | Grunthaner et al. |
| 2013/0082970 A1 | 4/2013 | Frey |
| 2013/0135250 A1 | 5/2013 | Song |
| 2013/0135256 A1 | 5/2013 | Hong et al. |
| 2013/0180841 A1 | 7/2013 | Yilmaz et al. |
| 2013/0229350 A1 | 9/2013 | Shaw et al. |
| 2013/0252521 A1 | 9/2013 | Kasashima et al. |
| 2013/0321321 A1 | 12/2013 | Hiraoka |
| 2014/0043289 A1 | 2/2014 | Stern et al. |
| 2014/0085213 A1 | 3/2014 | Huppi et al. |
| 2015/0068897 A1 | 3/2015 | Neel et al. |
| 2015/0130742 A1 | 5/2015 | Chen et al. |
| 2015/0363023 A1 | 12/2015 | Kawaguchi et al. |

FOREIGN PATENT DOCUMENTS

| | | |
|---|---|---|
| CN | 101436111 | 5/2009 |
| CN | 101739183 | 6/2010 |
| CN | 102112947 | 6/2011 |
| CN | 103207716 | 7/2013 |
| CN | 203606807 | 5/2014 |
| CN | 104969158 | 10/2015 |
| CN | 105278735 | 1/2016 |
| EP | 2071312 | 6/2009 |
| JP | 2010079791 | 4/2010 |
| JP | 2011153826 | 8/2011 |
| WO | WO 14/092758 | 6/2014 |
| WO | WO 14/124173 | 8/2014 |
| WO | WO 15/047374 | 4/2015 |
| WO | WO 15/106183 | 7/2015 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

SENSOR LAYER HAVING A PATTERNED COMPLIANT LAYER

CROSS-REFERENCE TO RELATED APPLICATION(S)

This application claims the benefit under 35 U.S.C. § 119(e) of U.S. Provisional Patent Application No. 62/235,414, filed on Sep. 30, 2015, and entitled "Sensing Structure Having A Patterned Compliant Layer," which is incorporated by reference as if fully disclosed herein.

FIELD

The described embodiments relate generally to a sensor or a sensor layer in an electronic device that includes a patterned compliant layer.

BACKGROUND

Electronic devices include many different electrical, mechanical, and structural components. One example of an electrical component is a sensor, such as a capacitive force sensor that can be used to detect a touch or force input applied to a surface of the electronic device. In some instances, a capacitive force sensor includes one or more pairs of conductive electrodes. The conductive electrodes in each pair are separated by a gap.

In some situations, such as when an electronic device is dropped, the first and second substrates in the force sensor can move or slide laterally with respect to each other. This movement is caused at least in part by the shear forces experienced by the force sensor when the electronic device lands at an angle on a rigid surface (e.g., on a floor or sidewalk). When a shear force having a sufficient magnitude is exerted on the force sensor, one substrate can move laterally enough with respect to the other substrate that the force sensor is rendered inoperable or breaks apart completely.

SUMMARY

In a sensor or sensor layer, a patterned compliant layer can be positioned between a first substrate and a second substrate. The patterned compliant layer can deform when one or more of a compressive force and/or a shear force is/are exerted on the sensor layer. The pattern compliant layer includes multiple angled compliant elements that are tilted or angled at one or more angles with respect to the first and second substrates. The patterned compliant layer is configured to behave isotropically along one axis (e.g., a horizontal axis) and anisotropically in a perpendicular axis (e.g., a vertical axis). Thus, the patterned compliant layer can behave isotropically based on a shear force (e.g., a horizontal force along the plane of the patterned compliant layer) and anisotropically based on a downward compressive force (e.g., a vertical force applied perpendicular to the plane of the patterned compliant layer). In some embodiments, the patterned compliant layer is configured as a transversely isotropic compliant layer.

In one embodiment, the sensor layer is a force sensor layer. The force sensor layer can include a first substrate that includes one or more force sensitive structures formed in or on the first substrate. A second substrate includes one or more force sensitive structures formed in or on the second substrate. In one embodiment, the one or more force sensitive structures associated with the first substrate comprise a first set of conductive electrodes, and the one or more force sensitive structures associated with the second substrate comprise a second set of conductive electrodes. The first and second sets of conductive electrodes can each include one or more conductive electrodes. In some embodiments, each conductive electrode in the first set of conductive electrodes can be paired with (e.g., aligned vertically with) a respective conductive electrode in the second set of conductive electrodes to produce one or more capacitors. The capacitance of each capacitor can vary based on an applied force. The patterned compliant layer is positioned between the first and second substrates. The patterned compliant layer includes multiple angled compliant elements that are angled at one or more angles with respect to the first and second substrates.

The force sensor layer can be included in an electronic device. For example, in one embodiment an electronic device can include a first force sensor layer positioned around at least a portion of a perimeter of an enclosure of the electronic device. Additionally or alternatively, a second force sensor layer may be positioned within or adjacent a display stack in the electronic device (e.g., below the display stack). At least one of the first or second force sensor layers can include a patterned compliant layer positioned between a first substrate and a second substrate. The patterned compliant layer includes multiple angled compliant elements that are angled at one or more angles with respect to the first and second substrates. The angled compliant elements may be formed with any suitable material. One example material is a polymer material (e.g., silicone).

BRIEF DESCRIPTION OF THE DRAWINGS

The disclosure will be readily understood by the following detailed description in conjunction with the accompanying drawings, wherein like reference numerals designate like structural elements, and in which.

The cross-hatching in the figures is provided to distinguish the elements or components from one another. The cross-hatching is not intended to indicate a type of material or materials or the nature of the material(s).

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a sensor or sensor layer that can be included in an electronic device. The sensor layer includes a patterned compliant layer positioned between two substrates. The patterned compliant layer includes multiple angled compliant elements that provide a higher degree of deformability or compressibility compared to an unpatterned compliant layer (e.g., continuous compliant layer). The higher degree of deformability or compressibility is due at least in part to the compliant material that forms the angled compliant elements. The angled compliant elements can buckle or move when one or more forces are exerted on the force sensor layer. Additionally or alternatively, the patterned compliant layer may be configured to behave isotropically along one axis (e.g., a horizontal axis) and anisotropically in a perpendicular axis (e.g., a vertical axis). In some embodiments, the patterned compliant layer is configured as a transversely isotropic compliant layer.

In one embodiment, the sensor layer is a capacitive force sensor layer that can be used to detect touch inputs and/or force inputs that are applied to a surface of an electronic device. In one non-limiting example, each substrate can be a flexible circuit that includes one or more conductive electrodes. In such an embodiment, the patterned compliant layer may be a dielectric for each capacitor formed by one or more pairs of conductive electrodes. The patterned compliant layer may be formed with any suitable material. One example material is a polymer material (e.g., silicone).

In some embodiments, a force sensor layer does not produce a binary output (e.g., on or off, enable or disable), but instead is configured to produce three or more outputs. The force sensor layer is operable to determine and operate across a range of forces, and can distinguish different forces or force inputs. In some embodiments, a first force input having a first amount of force can be used to select or control a function or application of an electronic device while a second force input having a different (e.g., greater) second amount of force may be used to select another function or application or to control the same or a different function or application. For example, in a scrolling operation, a first force input having a lower amount of force can cause the scrolling operation to scroll at a first speed while a second force input having a higher amount of force can cause the scrolling operation to scroll at a faster second speed.

These and other embodiments are discussed below with reference to FIGS. 1-15. However, those skilled in the art will readily appreciate that the detailed description given herein with respect to these Figures is for explanatory purposes only and should not be construed as limiting.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with the layers of a structure or sensor that is included in an electronic device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
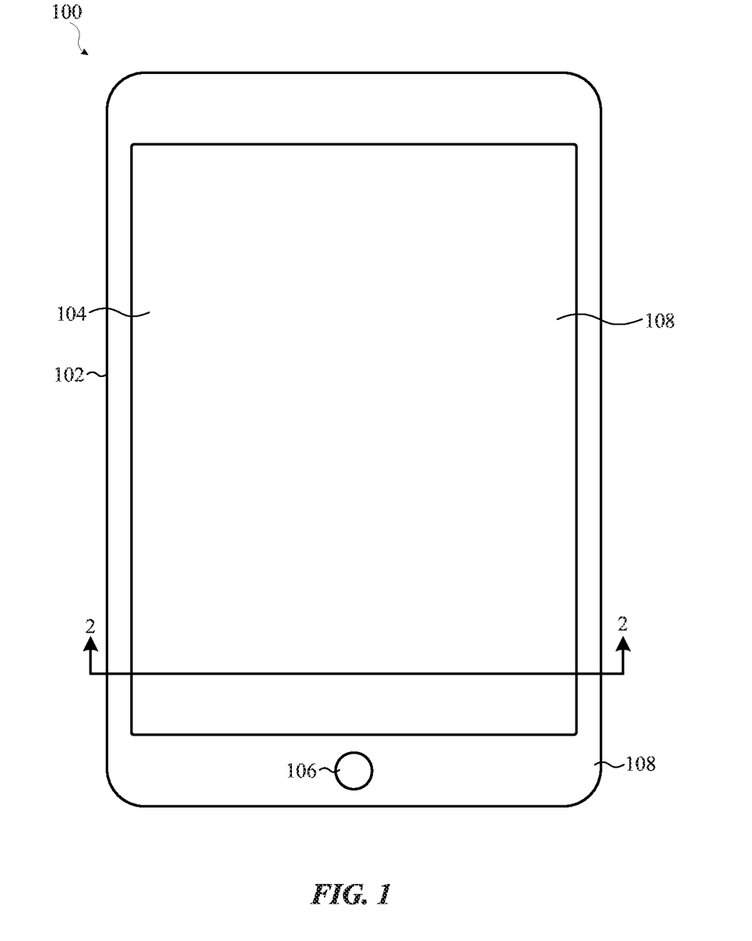
FIG. 1 shows a plan view of one example of an electronic device that can include one or more sensor layers.

FIG. 1 illustrates a plan view of one example of an electronic device that can include one or more sensor layers. The illustrated electronic device 100 is depicted as a tablet computing device. Other embodiments, however, are not limited to a tablet computing device. For example, an electronic device can be a wearable communication device, a wearable health assistant, a digital music player, a gaming device, a smart telephone, a laptop computer, a remote control, and any other suitable electronic device that includes one or more force sensor layers.

An enclosure 102 can form an outer surface or partial outer surface for the internal components of the electronic device 100. The enclosure 102 at least partially surrounds a display 104 and one or more input/output (I/O) devices 106. The enclosure 102 can be formed of one or more components operably connected together, such as a front piece and a back piece. Alternatively, the enclosure 102 can be formed of a single piece operably connected to the display 104. The enclosure 102 can be formed of any suitable material, including, but not limited to, plastic and metal. In the illustrated embodiment, the enclosure 102 is formed into a substantially rectangular shape, although this configuration is not required.

The display 104 can provide a visual output to the user. The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 104 can function as an input device that allows the user to interact with the electronic device 100. For example, the display can include a touch sensing device that allows the display to function as a multi-touch display.

In the illustrated embodiment, the I/O device 106 is an input button, which may be a mechanical button, a soft button (e.g., a button that does not physically move but still accepts inputs), an icon or image on a display, and so on. Further, in some embodiments, the button can be integrated as part of a cover layer of the electronic device. Although not shown in FIG. 1, the electronic device 100 can include other types of I/O devices, such as a microphone, a speaker, a camera, and one or more ports such as a network communication port and/or a power cord port.

In some embodiments, a cover layer 108 can be disposed over a top surface of the display 104 and the electronic device 100. The cover layer can be a transparent cover layer when the cover layer is disposed over the display (or the portion of the cover layer overlying the display may be transparent). The cover layer 108 may be made of any suitable material, such as glass, plastic, or sapphire.

In some embodiments, the electronic device can include one or more sensors that are positioned within the electronic device or around a periphery (e.g., an internal periphery) of the electronic device. For example, a proximity sensor, a motion sensor, a touch sensor, and/or a force sensor may be included in the electronic device. In non-limiting examples, a force sensor layer may be included in the I/O device 106, in or adjacent the display stack, and/or around a periphery of the electronic device. In a non-limited embodiment, a force sensor layer can be used to measure an amount of force and/or a change in force that is applied to the I/O device 106, or to a cover layer 108 positioned over the I/O device 106. In another embodiment, a force sensor layer can be positioned adjacent at least a portion of the enclosure 102 to detect a force and/or a change in force that is applied to the enclosure 102 or to a cover layer 108 positioned over the enclosure 102. Additionally or alternatively, a force sensor layer may be included in a display stack for the display 104. The force sensor layer can be used to measure an amount of force and/or a change in force that is applied to the display 104, to a portion of the display 104, or to a cover layer 108 positioned over the display 104.

Figure 2:
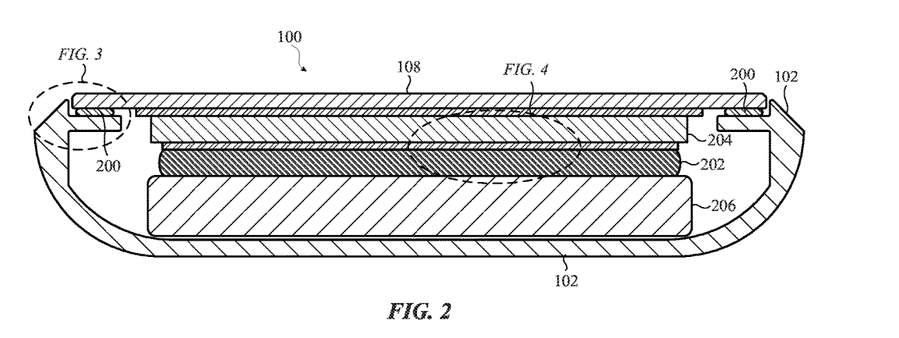
FIG. 2 shows a cross-sectional view of the electronic device taken along line 2-2 in FIG. 1.

FIG. 2 shows a cross-sectional view of the electronic device taken along line 2-2 in FIG. 1. In the illustrated embodiment, a first force sensor layer 200 may be positioned along a perimeter of the electronic device 100. In the illustrated embodiment, the first force sensor layer 200 is a continuous structure that extends completely around the internal perimeter of the electronic device 100. In other embodiments, the first force sensor layer 200 can be one or more discrete force sensor layers that is/are disposed at select locations around the internal perimeter of the electronic device 100 and/or within the electronic device 100.

Additionally or alternatively, a force sensor layer can be positioned below the display stack 204, over the display stack 204, and/or within the display stack 204. In the illustrated embodiment, the second force sensor layer 202 is disposed below the display stack 204. As shown in FIG. 2, the display stack 204 is positioned below the cover layer 108. The display stack 204 can include multiple layers, such as a front polarizer layer, a display layer disposed below the front polarizer layer, and a rear polarizer layer positioned below the display layer. As described previously, the display layer may take a variety of forms, including a LCD display layer, a LED display layer, and an OLED display layer.

Structural elements and additional electronic circuitry and components 206 can be positioned below the second force sensor layer 202. The structural elements may include a support plate, a midplate, a bracket, and/or a frame. The additional electronic circuitry and components can include a battery, an antenna, one or more processing devices, memory, network communications circuitry, and one or more circuit boards or flexible printed circuits.

In some embodiments, a force sensor layer can be made with one or more optically transparent materials. For example, a force sensor layer that is positioned over a display layer may be formed with an optically transparent material or materials. The term "optically transparent" is defined broadly to include a material or materials that is/are transparent, translucent, or not visually detectable by the human eye.

In embodiments that include two or more force sensor layers, a force input may be detected by one force sensor layer operating independent of the other force sensor layer (s) or by two or more force sensor layers operating in combination.

Figure 3:
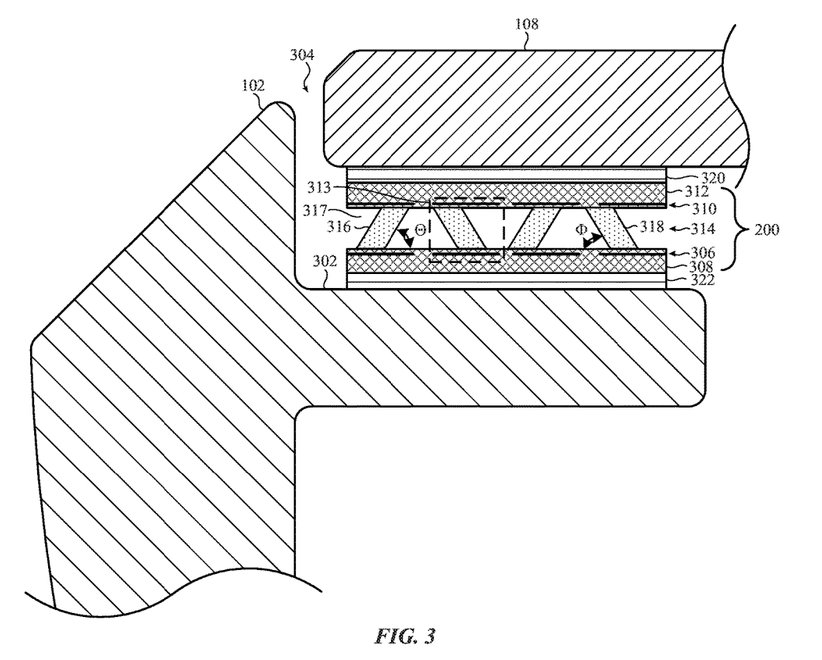
FIG. 3 shows an enlarged cross-sectional view of an example force sensor layer that is suitable for use as the first sensor layer shown in FIG. 2.

FIG. 3 shows an enlarged cross-sectional view of an example force sensor layer that is suitable for use as the first force sensor layer shown in FIG. 2. In the illustrated embodiment, the first force sensor layer 200 is positioned between the enclosure 102 and the cover layer 108. In particular, the first force sensor layer 200 rests on a ledge 302 of the enclosure 102. The ledge 302 extends into the interior of the electronic device 100. In some embodiments, the ledge 302 can be integrally formed as part of the enclosure 102. Alternatively, in other embodiments the ledge 302 may be connected or affixed to the enclosure 102 using any suitable attachment mechanism. For example, the ledge 302 can be affixed to the enclosure 102 using an adhesive, one or more mechanical attachments such as a screw, or by welding the ledge 302 to the enclosure 102.

In the illustrated embodiment, the enclosure 102 includes an opening 304 that corresponds to the shape of the cover layer 108. The cover layer 108 is disposed in the opening 304. As shown in FIG. 3, a top surface of the cover layer 108 can extend beyond the top surface of the enclosure 102. In other embodiments, the top surface of the cover layer 108 may be co-planar with or below the top surface of the enclosure 102.

In some embodiments, the first force sensor layer 200 can seal the space or the junction between the top surface of the ledge 302 and the bottom surface of the cover layer 108. As described earlier, in one embodiment the first force sensor layer 200 is a continuous structure that extends completely around the internal periphery of the electronic device 100. In another embodiment, the first force sensor layer 200 can be one or more discrete force sensor layers that is/are disposed at select locations around the internal perimeter of the electronic device 100.

The first force sensor layer 200 can include any suitable circuitry or components that support the operations and functionality of the force sensor layer. In a non-limiting example, one or more first force sensitive structures can be formed in or over a surface of a first substrate layer 308 and one or more second force sensitive structures may be formed in or over a surface of a second substrate layer 312. The first and second substrate layers 308, 312 can be formed with any suitable material or materials. For example, the first and second substrate layers 308, 312 can each be a flexible printed circuit.

Additionally, the one or more first and second force sensitive structures may be formed with any suitable material or materials. In the disclosed embodiments, the one or more first and second force sensitive structures include first and second sets of conductive electrodes 306, 310, respectively. However, in other embodiments the one or more first and second force sensitive structures are not limited to conductive electrodes. A force sensor layer can be constructed with different force sensitive structures. For example, force sensitive structures can be implemented with strain gauges, magnetic components, or piezo components (e.g., piezoelectric components).

The first and second sets of conductive electrodes 306, 310 can each include one or more conductive electrodes. For example, the first set of conductive electrodes 306 can include a single continuous conductive electrode and the second set of conductive electrodes 310 may include multiple discrete conductive electrodes. Alternatively, the first set of conductive electrodes 306 can include multiple discrete conductive electrodes and the second set of conductive electrodes 310 may include a single continuous conductive electrode. And in some embodiments, both the first and second set of conductive electrodes 306, 310 can include multiple discrete conductive electrodes (as shown in FIG. 3).

The first and second sets of conductive electrodes 306, 310 can be arranged to produce one or more capacitors having a capacitance that varies with force. In one non-limiting example, each conductive electrode in the first set of conductive electrodes 306 is aligned vertically with a respective conductive electrode in the second set of conductive electrodes to produce one or more pairs of conductive electrodes 313. Each pair of conductive electrodes 313 forms a capacitor. The first force sensor layer 200 is configured to produce capacitance changes based on a force applied to the cover layer 108. The capacitance of one or more capacitors in the first force sensor layer 200 may vary when a user applies a force to the cover layer 108. A processing device (not shown) operably connected to the first force sensor layer 200 can configured to receive one or more signals from the first force sensor layer 200 that represent the capacitance of one or more capacitors and correlate the capacitance(s) (or changes in capacitance) to an amount of applied force (or a change in force). The user can apply the force to the cover layer 108 with a body part (e.g., a finger) or with a device, such as a stylus.

A patterned compliant layer 314 is disposed between the first and second substrate layers 308, 312. The patterned compliant layer 314 includes a first set of tilted or angled compliant elements 316 that are angled at an angle Θ (theta) with respect to the first and second substrate layers 308, 312. Additionally or alternatively, the illustrated patterned compliant layer 314 can include a second set of angled compliant elements 318 that are angled at an angle Φ (phi) with respect to the first and second substrate layers 308, 312. The angled compliant elements 316, 318 can be formed with any suitable compliant material or materials. As one example, the angled compliant elements 316, 318 are made of a polymer material, such as silicone, but other embodiments are not limited to this configuration.

In some embodiments, the angled compliant elements 316, 318 can be made of the same compliant material(s). In other embodiments, the compliant material(s) used to form some of the angled compliant elements can differ from the compliant material(s) used to form other angled compliant elements. For example, the angled compliant elements 316 (or a portion thereof) can be formed with a first compliant material and the angled compliant elements 318 (or a portion thereof) may be formed with a different second compliant material.

The patterned compliant layer 314 includes surrounding compliant material 317 that is positioned between the angled compliant elements 316, 318. The surrounding compliant material 317 can have a greater degree of deformation or compression compared to the angled compliant elements 316, 318. This allows the angled compliant elements 316, 318 to buckle or move into the surrounding compliant material 317 when a force is received by the force sensor layer 200. Any suitable material or materials can be used to form the surrounding compliant material 317. Example materials include, but are not limited to, air, a foam, and a gel or viscous material.

In the illustrated embodiment the patterned compliant layer 314 and the surrounding compliant material 317 may act as a dielectric for the one or more capacitors that are formed by the pairs of conductive electrodes 313 in the first and second sets of conductive electrodes 306, 310. Additionally or alternatively, the patterned compliant layer 314 is configured to provide elastic deformation to the first force sensor layer 200 based on a touch and/or a force applied to the cover layer 108. Patterning the compliant layer 314 can provide a higher degree of deformability or compressibility because the compliant material(s) that forms the angled compliant elements 316, 318 can buckle or move into the surrounding compliant material 317 (e.g., air) when a force is applied to the cover layer 108.

The first force sensor layer 200 is attached to the cover layer 108 and to the enclosure 102 through adhesive layers 320, 322 respectively. The first adhesive layer 320 is positioned between the second substrate layer 312 and the bottom surface of the cover layer 108. The second adhesive layer 322 is positioned between the first substrate layer 308 and the top surface of the ledge 302. Any suitable adhesive material can be used in the adhesive layers 320, 322. In one embodiment, the first and second adhesive layers 320, 322 are pressure sensitive adhesive layers.

Figure 4:
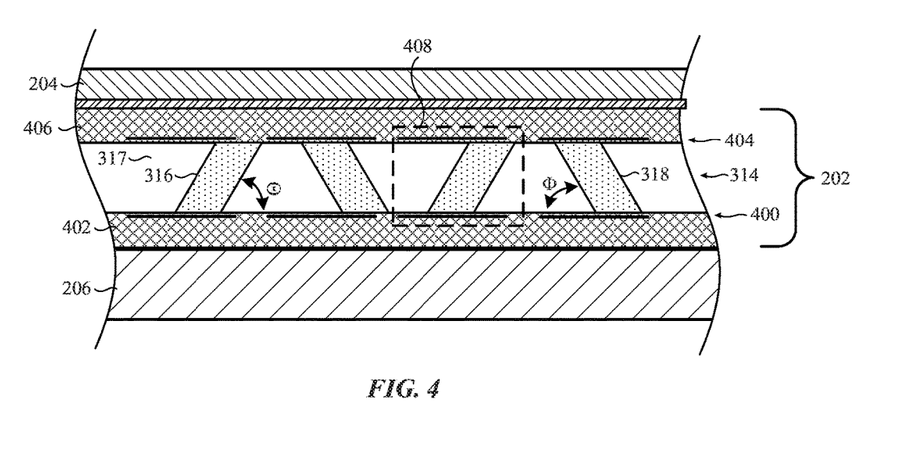
FIG. 4 shows an enlarged cross-sectional view of an example force sensor layer that is suitable for use as the second sensor layer shown in FIG. 2.

FIG. 4 shows an enlarged cross-sectional view of an example force sensor layer that is suitable for use as the second force sensor layer shown in FIG. 2. In the illustrated embodiment, the second force sensor layer 202 is positioned between the display stack 204 and the structural elements and electronic circuitry and components 206. In one embodiment, the second force sensor layer 202 is a continuous structure that extends completely below the display stack 204. In another embodiment, the second force sensor layer 202 can be one or more discrete force sensor layers that is/are disposed at select locations in the electronic device 100.

Like the first force sensor layer 200, the second force sensor layer 202 can include any suitable circuitry or components that support the operations and functionality of the force sensor layer. In a non-limiting example, a first set of conductive electrodes 400 can be formed in or over a surface of a first substrate layer 402 and a second set of conductive electrodes 404 may be formed in or over a surface of a second substrate layer 406. The first and second sets of conductive electrodes 400, 404 can be configured similar to the conductive electrodes 306, 310 in FIG. 3. In particular, each conductive electrode in the first set of conductive electrodes 400 is aligned vertically with a respective conductive electrode in the second set of conductive electrodes 404 to produce one or more pairs of conductive electrodes 408. Each pair of conductive electrodes 408 forms a capacitor.

The second force sensor layer 202 is configured to produce capacitance changes based on a force applied to the cover layer 108. The capacitance of one or more capacitors in the second force sensor layer 202 may vary when a user applies a force to the cover layer 108. A processing device (not shown) operably connected to the second force sensor layer 202 can be configured to receive one or more signals from the second force sensor layer 202 that represent the capacitance of one or more capacitors and correlate the capacitance(s) (or changes in capacitance) to an amount of applied force (or a change in force).

The patterned compliant layer 314 is disposed between the first and second substrate layers 402, 406. The patterned compliant layer 314 includes the first set of angled compliant elements 316 and the second set of angled compliant elements 318. As discussed earlier, the patterned compliant layer 314 and the surrounding compliant material 317 may act as a dielectric for the one or more capacitors that are formed by the pairs of conductive electrodes in the first and second sets of conductive electrodes 400, 404. Additionally or alternatively, the patterned compliant layer 314 is configured to provide elastic deformation to the second force sensor layer 202 based on a touch and/or a force applied to the cover layer 108. As described earlier, the patterned compliant layer 314 can provide a higher degree of deformability or compressibility compared to an unpatterned compliant layer (e.g., continuous compliant layer) because the compliant material(s) that forms the angled compliant elements 316, 318 can buckle or move into the surrounding compliant material 317 (e.g., air) when a force is applied to the cover layer 108.

Figure 5:
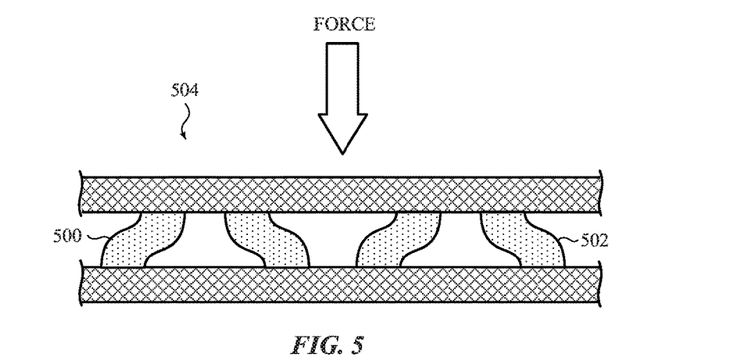
FIG. 5 depicts one example of compliant elements buckling when a downward force is applied to the force sensor layer.

FIG. 5 depicts one example of angled compliant elements 500, 502 buckling when a downward force is applied to the force sensor layer 504. Thus, in some embodiments the angled compliant elements 316, 318 can provide both a structural benefit (e.g., structural support) and deformation when a force is applied to the force sensor layer 504. For example, the angled compliant elements 316, 318 can provide both structural support and deformation when an electronic device that includes a force sensor layer is dropped and lands on a rigid surface.

In some embodiments, the patterned compliant layer 314 may be configured to behave isotropically along one axis (e.g., a horizontal axis) and anisotropically in a perpendicular axis (e.g., a vertical axis). Thus, the patterned compliant layer 314 can behave isotropically based on a shear force (e.g., a horizontal force along the plane of the patterned compliant layer) and anisotropically based on a downward compressive force (e.g., a vertical force applied perpendicular to the plane of the patterned compliant layer).

In one embodiment, the angles $\Theta$ and $\Phi$ are the same angle (e.g., 60 degrees). In other embodiments, the angles $\Theta$ and $\Phi$ can be different angles. In one non-limiting example, the angle $\Theta$ may be 50 degrees and the angle $\Phi$ 60 degrees.

In some embodiments the angle $\Theta$ can be one value for some of the compliant elements 316 and another value for other compliant elements 316 in the first set of compliant elements. Additionally or alternatively, the angle $\Phi$ can be one value for some of the compliant elements 318 and another value for other compliant elements 318 in the second set of compliant elements.

Figure 6:
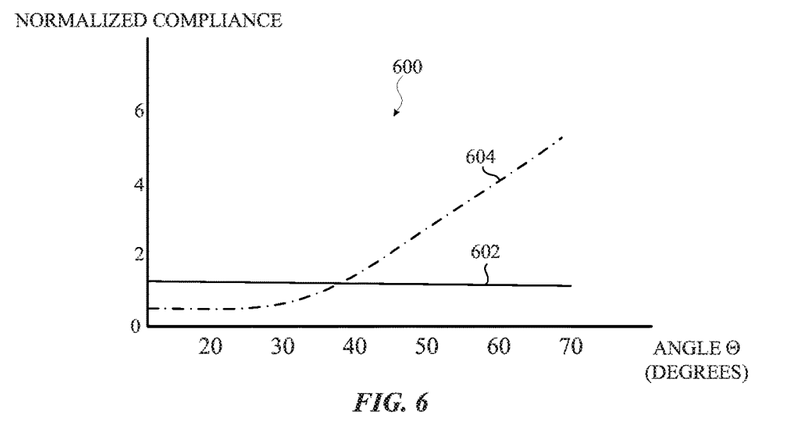
FIG. 6 shows an example plot of the angle theta and the normalized compliance for the patterned compliant layer shown in FIGS. 3 and 4.

FIG. 6 shows an example plot of the angle theta and the normalized compliance for the patterned compliant layers shown in FIGS. 3 and 4. The normalized compliance is defined by the shear compliance divided by the compressive compliance. This ratio can be adjusted by changing the value of the angle $\Theta$. The normalized compliance is represented on the vertical axis of the plot 600. The angle $\Theta$ is represented on the horizontal axis of the plot 600. Plot 602 represents the normalized compressive compliance. As shown, the normalized compressive compliance does not vary much as the value of $\Theta$ increases. Thus, the value of $\Theta$ does not substantially impact the normalized compressive compliance of the patterned compliant layer 314.

Plot 604 represents the normalized shear compliance. As depicted, the normalized shear compliance increases as the value of $\Theta$ increases. Thus, the patterned compliant layer 314 can provide greater shear compliance with a higher value of $\Theta$. In many situations, the direction of the shear force with respect to the angle $\Theta$ does not matter. One side of each angled compliant element is held in tension while the other side is held in compression, so the patterned compliant layer 314 provides improved shear compliance regardless of whether the shear force is in the same direction of the angle $\Theta$ or is counter to the direction of the angle $\Theta$. Although not shown in FIG. 6, plots of the normalized shear compliance and the normalized compressive compliance can be similar for the angle $\Phi$ of the patterned compliant layer 314.

The behavior of the patterned compliant layer 314 can be based at least in part on the angles $\Theta$ and $\Phi$. In particular, the shear and compression responses of a sensor layer with a patterned compliant layer can be tuned or adjusted by changing at least one of the angle $\Theta$ and/or the angle $\Phi$. For example, for the sensor layers shown in FIGS. 3 and 4, the normalized compliance can be increased by increasing the angles $\Theta$ and $\Phi$.

Figure 7:
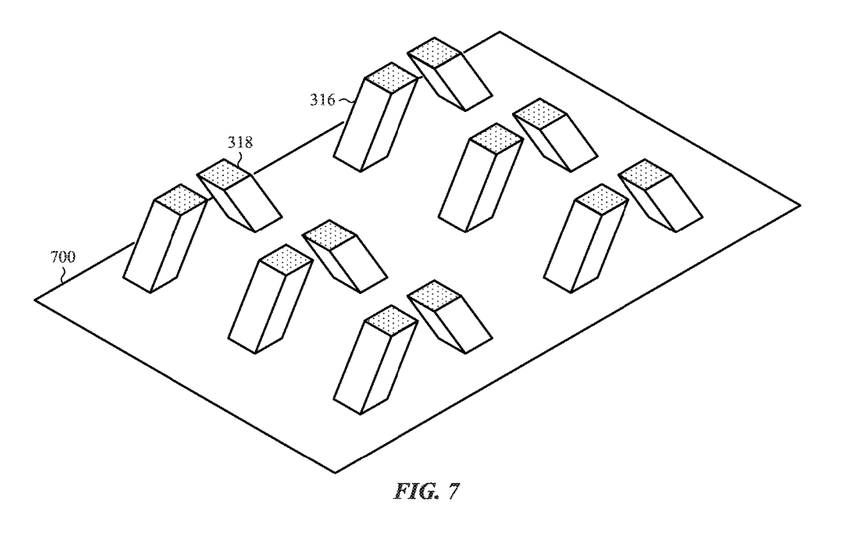
FIGS. 7-9 show example angled compliant elements that are suitable for use with the patterned compliant layer shown in FIGS. 3 and 4.
Figure 8:
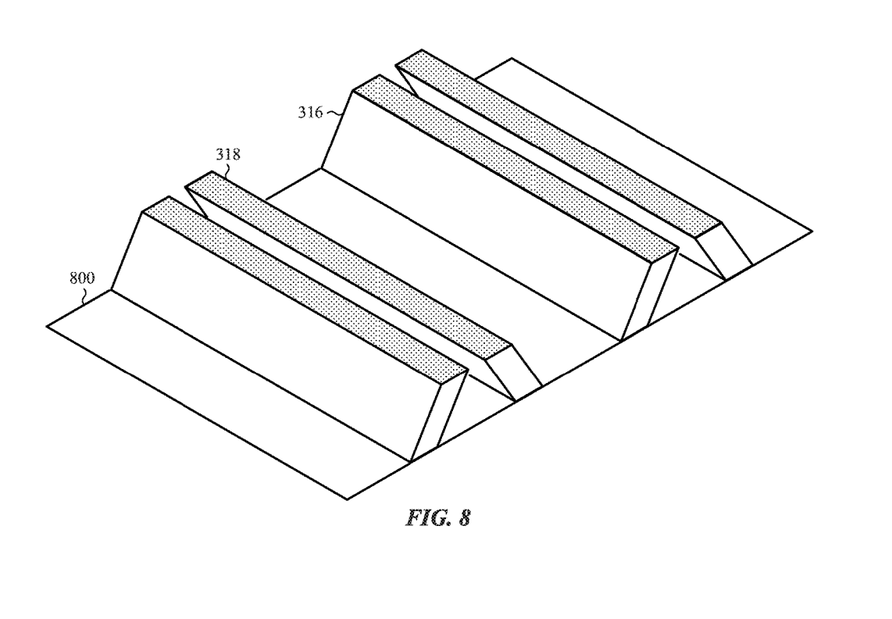
Figure 9:
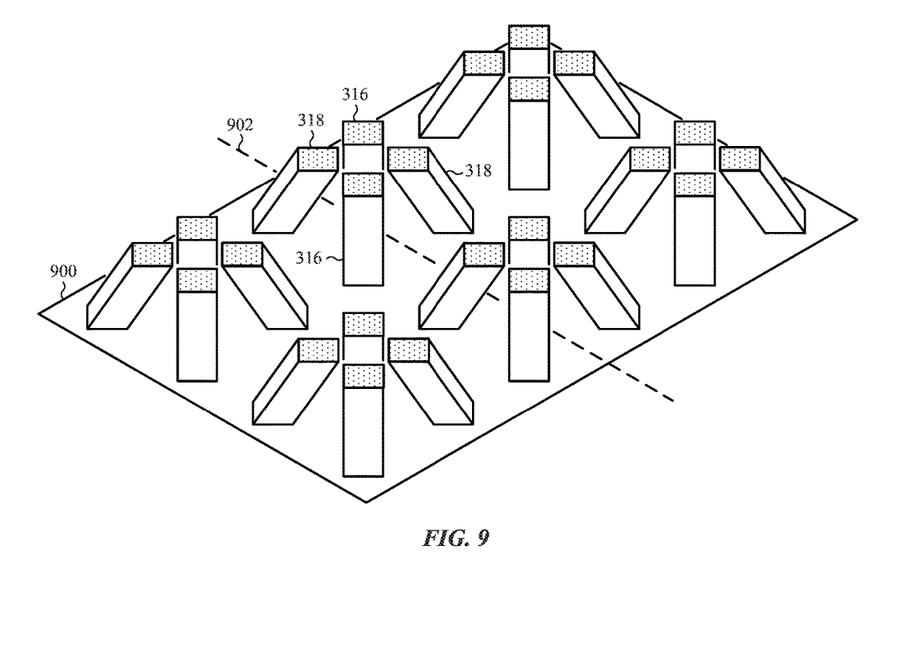

FIGS. 7-9 show example angled compliant elements that are suitable for use with the patterned compliant layer shown in FIGS. 3 and 4. In FIG. 7, the angled compliant elements 316, 318 are arranged in an array (e.g., rows and columns of angled compliant elements) on a substrate 700. As described earlier, a compliant layer is positioned between two substrate layers (not shown), and the angled compliant elements 316, 318 are angled at an angle with respect to the first and second substrate layers (e.g., substrate layers 308 and 312 in FIG. 3). Although shown as square pillars or columns in FIG. 7, the angled compliant elements 316, 318 can be configured in any given shape. Example shapes include, but are not limited to, rectangular and circular shapes.

In FIG. 8, the angled compliant elements 316, 318 are arranged linearly and extend across the width of the substrate 800. Although shown as linear angled compliant elements in FIG. 8, the angled compliant elements 316, 318 can be configured in any uninterrupted or continuous shape. For example, the angled compliant elements 316, 318 can be configured in "S" shapes.

Figure 10:
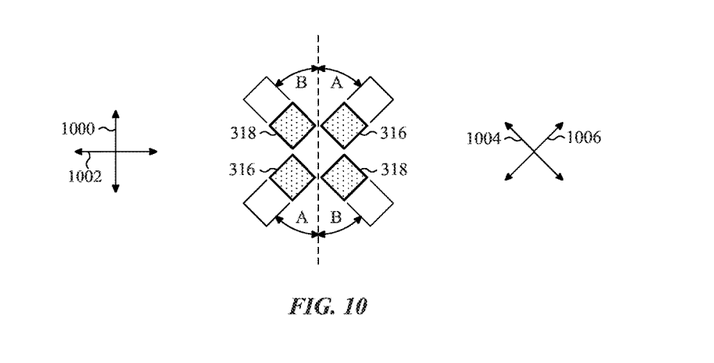
FIG. 10 shows one example of a transversely isotropic compliant layer.

The patterned compliant elements can behave isotropically based on a shear force (e.g., a horizontal force along the plane of the patterned compliant layer) and anisotropically based on a downward compressive force (e.g., a vertical force applied perpendicular to the plane of the patterned compliant layer). However, in some embodiments it may be desirable to configure the patterned compliant layer as a transversely isotropic compliant layer. One example of a transversely isotropic compliant layer is shown in FIGS. 9 and 10. A first set of angled compliant elements 316 is arranged at a first angle A (see FIG. 10) with respect to an axis 902 along a horizontal plane of the substrate 900. A second set of angled compliant elements 318 is arranged at a second angle B (see FIG. 10) with respect to the axis 902. Angles A and B can each be any suitable angle value. For example, in one embodiment the angles A and B are +/−45 degrees with respect to the axis 902.

Positioning the angled compliant elements 316, 318 at angles can cause the patterned compliant layer to behave differently when a shear force is applied in a different direction. For example, as shown in FIG. 10, the angled compliant elements 316, 318 can provide substantially similar shear compliance when a shear force is applied in the direction 1000 or in the direction 1002 (within the plane of the patterned compliant layer). Additionally, the angled compliant elements 316, 318 can provide substantially similar shear compliance when a shear force is applied in an angled direction, such as, for example, direction 1004 or in the direction 1006 (within the plane of the patterned compliant layer).

Figure 11:
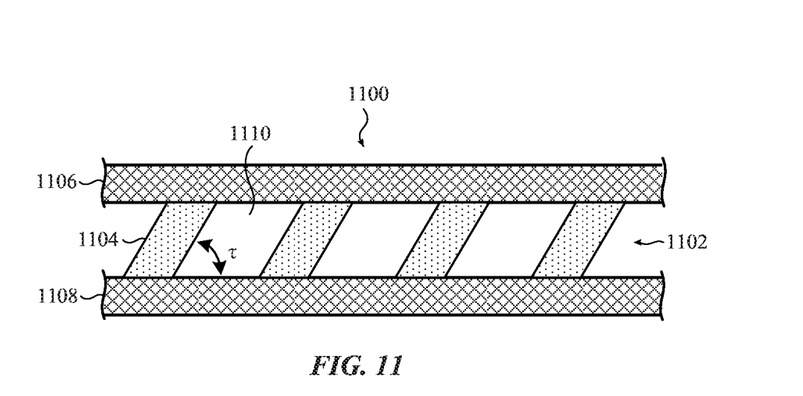
FIG. 11 shows a cross-sectional view of an alternate force sensor layer that is suitable for use as the first and/or second sensor layers shown in FIGS. 3 and 4.

FIG. 11 shows a cross-sectional view of an alternate force sensor layer that is suitable for use as the first and/or second force sensor layers shown in FIGS. 3 and 4. The first and second sets of conductive electrodes are omitted for clarity. In the alternate force sensor layer 1100, the patterned compliant layer 1102 includes a first set of angled compliant elements 1104 that are angled at an angle τ (tau) with respect to the first and second substrate layers 1106, 1108. The angled compliant elements 1104 can be formed with any suitable compliant material or materials, such as silicone. In some embodiments, the compliant material(s) used to form some of the angled compliant elements 1104 can differ from the compliant material(s) used to form other angled compliant elements 1104.

The pattern compliant layer 1102 includes surrounding compliant material 1110 that is positioned between the angled compliant elements 1104. The surrounding compliant material 1110 can have a greater degree of deformation or compression compared to the angled compliant elements 1104. This allows the angled compliant elements 1104 to buckle or move into the surrounding compliant material 1110 when a force is received by the force sensor layer 1100. Any suitable material or materials can be used to form the surrounding compliant material 1110. Example materials include, but are not limited to, air, a foam, and a gel or viscous material.

As discussed earlier, the patterned compliant layer 1102 and the surrounding compliant material 1110 may act as a dielectric for the one or more capacitors that are formed by pairs of conductive electrodes (not shown) formed in or over the first and second substrates 1106, 1108. Additionally or alternatively, the patterned compliant layer 1102 is configured to provide elastic deformation to the force sensor layer 1100 based on a force received by the force sensor layer 1100. Patterning the compliant layer 1102 can provide a higher degree of deformability or compressibility because the compliant material(s) that forms the angled compliant elements 1104 can buckle or move into the surrounding compliant material 1110 (e.g., air) when a force is received by the force sensor layer 1100.

Figure 12:
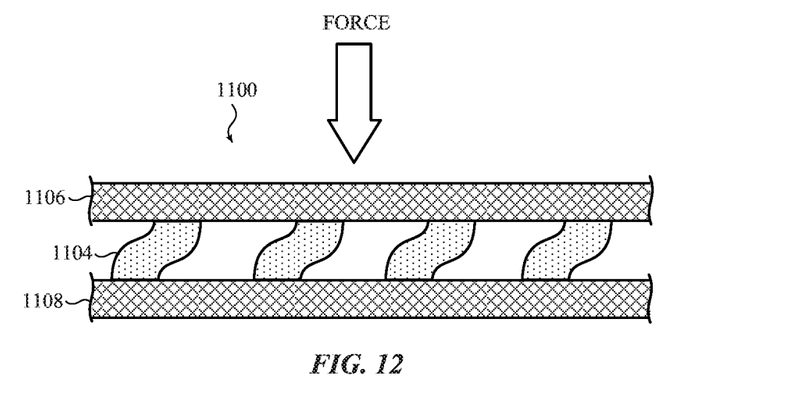
FIG. 12 shows the buckling of the patterned compliant layer when a force is applied to the alternate force sensor layer shown in FIG. 11.

FIG. 12 depicts one example of the angled compliant elements 1104 buckling when a downward force is applied to the force sensor layer 1100. The patterned compliant layer 1102 can behave isotropically based on a shear force (e.g., a horizontal force along the plane of the patterned compliant layer) and anisotropically based on a downward compressive force (e.g., a vertical force applied perpendicular to the plane of the patterned compliant layer). Like the force sensor layers 200 and 202 shown in FIG. 2, in some embodiments the angled compliant elements 1104 can provide both a structural benefit (e.g., structural support) and deformation when a force is applied to the force sensor layer 1100.

In some situations, one of the substrates may shift laterally with respect to the other substrate layer depending on the direction of the angle of the angled compliant elements 1104. For example, in the illustrated embodiment the first substrate layer 1106 may shift laterally with respect to the second substrate layer 1108 (e.g., to the right) when a downward force is exerted on the force sensor layer 1100. This is because the angled compliant elements 1104 can buckle to the right based on the applied force.

Figure 13:
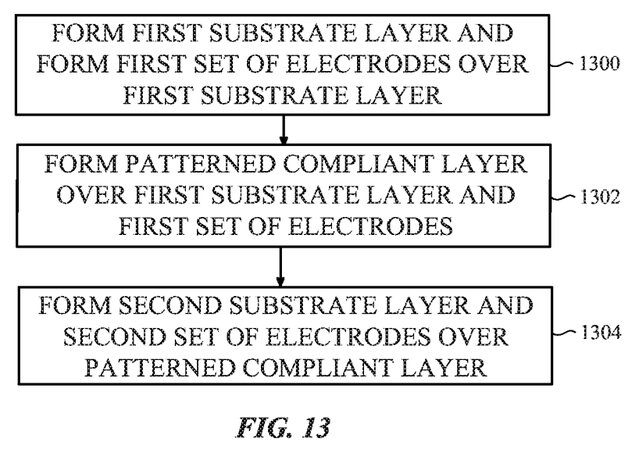
FIG. 13 shows one example method for forming a sensor layer that includes a patterned compliant layer.

A patterned compliant layer can be made using any suitable manufacturing technique. FIG. 13 shows one example method for forming a sensor layer that includes a patterned compliant layer. Initially, as shown in block 1300, the first substrate layer is formed and the first set of conductive electrodes is formed over the first substrate layer. The first substrate layer and the first set of conductive electrodes can be formed using any suitable technique. In one non-limited example, the first substrate layer and/or the first set of conductive electrodes may be formed using additive manufacturing or three-dimensional printing techniques. In another non-limiting example, the first substrate layer and/or the first set of conductive electrodes can be formed with fabrication techniques used to form flexible printed circuits.

Figure 14:
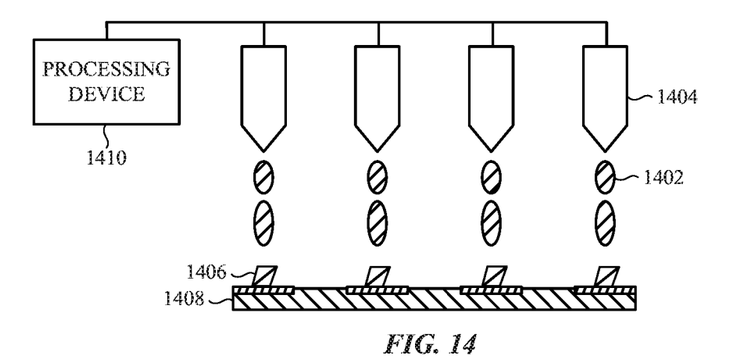
FIG. 14 shows one method of forming a patterned compliant layer over a first substrate layer.

Next, as shown in block 1302, the patterned compliant layer is formed over the first substrate layer and first set of conductive electrodes. The patterned compliant layer can be formed using any suitable technique. For example, FIG. 14 illustrates one method of forming a patterned compliant layer. The method uses an additive manufacturing or three-dimensional printing technique. A melted compliant material 1402 is jetted from thermal print heads 1404 to build or construct the angled compliant elements 1406 on the first substrate layer 1408 and the first set of conductive electrodes 1410. Any suitable compliant material may be used. For example, in one embodiment the compliant material can be silicone. The rate of output of the melted compliant material 1402 from the print heads 1404 may be controlled by a processing device 1412. Although only four compliant elements are shown in FIG. 14, those skilled in the art will appreciate that any number of compliant elements may be formed.

Figure 15:
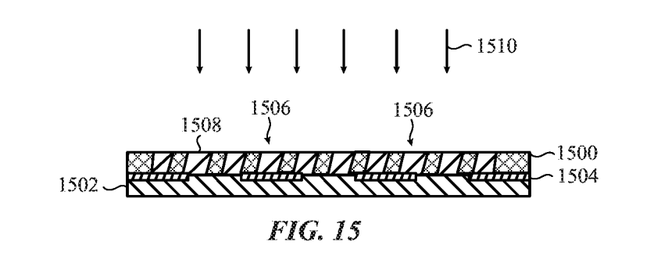
FIG. 15 shows one method of forming a patterned compliant layer over a first substrate layer.

FIG. 15 depicts another method of forming a patterned compliant layer. A mold or masking layer 1500 can be positioned over the first substrate layer 1502 and first set of conductive electrodes 1504. The masking layer includes openings 1506 that are shaped as the angled compliant elements. The openings can be filled with a UV curable compliant material 1508. Any suitable UV curable material may be used. For example, in one embodiment a UV curable silicone material is disposed in the openings 1506 in the masking layer 1500. Electromagnetic radiation 1510 can then be emitted towards the UV curable compliant material 1508 to cure or harden the angled compliant elements. Any suitable electromagnetic radiation may be used based on the UV curable compliant material. For example, the electromagnetic radiation can be light or an electron beam. The masking layer 1500 may then be removed, leaving the angled compliant elements.

Returning to FIG. 13, after the patterned compliant layer is produced, the second substrate layer and the second set of conductive electrodes can be formed over the patterned compliant layer (block 1304). The second substrate layer and the second set of conductive electrodes may be formed using a technique similar to the technique used to produce the first substrate layer and the first set of conductive electrodes. In one embodiment, the fabricated second substrate layer and second set of conductive electrodes is positioned over and secured to the patterned compliant layer.

Although the force sensor layer has been described as including first and second sets of conductive electrodes, other embodiments are not limited to this sensing technology. As described earlier, in other embodiments a force sensor layer can be constructed with different force sensitive structures. For example, a force sensor layer can be implemented with strain gauges, magnetic components, or piezo components.

Additionally, other types of sensors or sensor layers can include a patterned compliant layer that includes angled compliant elements. For example, a proximity sensor or a touch sensor can include a patterned compliant layer that includes angled compliant elements.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A force sensor layer, comprising:
a first substrate layer comprising one or more first force sensitive structures, the one or more first force sensitive structures comprising a first set of one or more conductive electrodes;
a second substrate layer comprising one or more second force sensitive structures, the one or more second force sensitive structures comprising a second set of one or more conductive electrodes; and
a patterned compliant layer positioned between the first and second substrate layers, the patterned compliant layer comprising multiple angled compliant elements that are angled between, and at one or more angles with respect to, the first and second substrate layers; wherein:
the first and second sets of one or more conductive electrodes are arranged to produce one or more capacitors having a capacitance that varies with force.

2. The force sensor layer of claim 1, wherein the multiple angled compliant elements include a first set of angled compliant elements angled at a first angle and a second set of angled compliant elements angled at a different second angle with respect to the first and second substrate layers.

3. The force sensor layer of claim 2, wherein the angled compliant elements in the first set of angled compliant elements are angled toward the angled compliant elements in the second set of angled compliant elements.

4. The force sensor layer of claim 1, wherein the patterned compliant layer comprises a transversely isotropic patterned compliant layer.

5. The force sensor layer of claim 1, wherein each of the multiple angled compliant elements is formed with silicone.

6. The force sensor layer of claim 1, wherein the force sensor layer is positioned adjacent a display stack in an electronic device.

7. The force sensor layer of claim 1, wherein the force sensor layer is positioned around at least a portion of a perimeter of an enclosure of an electronic device.

8. An electronic device, comprising:
a display stack; and
a sensor layer positioned within or adjacent the display stack, the sensor layer comprising a patterned compliant layer positioned between a first substrate layer and a second substrate layer, the patterned compliant layer comprising multiple angled compliant elements that are angled between, and at one or more angles with respect to, the first and second substrate layers; wherein:
the first substrate layer comprises one or more first force sensitive structures, the one or more first force sensitive structures comprising a first set of one or more conductive electrodes;
the second substrate layer comprises one or more second force sensitive structures, the one or more second force sensitive structures comprising a second set of one or more conductive electrodes; and
the first and second sets of one or more conductive electrodes are arranged to produce one or more capacitors having a capacitance that varies with force.

9. The electronic device of claim 8, wherein the multiple angled compliant elements include a first set of angled compliant elements angled at a first angle and a second set of angled compliant elements angled at a second angle with respect to the first and second substrate layers.

10. The electronic device of claim 8, wherein the sensor layer is positioned below the display stack.

11. The electronic device of claim 8, wherein the patterned compliant layer comprises a transversely isotropic patterned compliant layer.

12. The electronic device of claim 8, wherein at least one of the first substrate layer and the second substrate layer comprises a flexible printed circuit.

13. An electronic device, comprising:
an enclosure; and
a sensor layer positioned around at least a portion of a perimeter of the enclosure, the sensor layer comprising a patterned compliant layer positioned between a first substrate layer and a second substrate layer, the patterned compliant layer including multiple angled compliant elements that are angled between, and at one or more angles with respect to, the first and second substrate layers; wherein:
the sensor layer comprises a force sensor layer and the first and second substrate layers each include one or more force sensitive structures;
the one or more force sensitive structures associated with the first substrate layer comprise a first set of one or more conductive electrodes;
the one or more force sensitive structures associated with the second substrate layer comprise a second set of one or more conductive electrodes; and
the first and second sets of one or more electrodes are arranged to produce one or more capacitors that each has a capacitance that varies with force.

14. The electronic device of claim 13, wherein the patterned compliant layer comprises a transversely isotropic patterned compliant layer.

15. The electronic device of claim 13, wherein at least one of the first substrate layer and the second substrate layer comprises a flexible printed circuit.

16. The electronic device of claim 13, wherein the multiple angled compliant elements include a first set of angled compliant elements angled at a first angle and a second set of angled compliant elements angled at a second angle with respect to the first and second substrate layers.

* * * * *